(12) United States Patent
Barnes

(10) Patent No.: US 6,422,508 B1
(45) Date of Patent: Jul. 23, 2002

(54) SYSTEM FOR ROBOTIC CONTROL OF IMAGING DATA HAVING A STEERABLE GIMBAL MOUNTED SPECTRAL SENSOR AND METHODS

(75) Inventor: Donald Michael Barnes, Indialantic, FL (US)

(73) Assignee: Galileo Group, Inc., Melbourne, FL (US)

( * ) Notice: Subject to any disclaimer, the term of this patent is extended or adjusted under 35 U.S.C. 154(b) by 0 days.

(21) Appl. No.: 09/543,465

(22) Filed: Apr. 5, 2000

(51) Int. Cl.[7] .................. F41G 7/00; F42B 15/01
(52) U.S. Cl. ............. 244/3.16; 244/3.15; 342/52; 342/53; 342/54; 342/55; 342/58; 342/62; 342/63; 342/64; 342/65; 342/66; 342/192
(58) Field of Search .............. 342/61–66, 89, 342/90, 175, 195, 52–56, 189–197; 244/3.15–3.19

(56) References Cited

U.S. PATENT DOCUMENTS

| | | |
|---|---|---|
| 3,974,985 A | 8/1976 | Campbell et al. .......... 244/3.16 |
| 4,085,910 A | 4/1978 | Baker et al. ............... 244/3.16 |
| 4,123,134 A | 10/1978 | Meyers ...................... 350/6.7 |
| 4,367,913 A | 1/1983 | Logan et al. |
| 5,129,595 A | * 7/1992 | Thiede et al. .............. 244/3.16 |
| 5,276,321 A | 1/1994 | Chang et al. |
| 5,672,872 A | 9/1997 | Wu et al. .................... 250/330 |
| 6,008,492 A | 12/1999 | Slater et al. |
| 6,179,246 B1 | * 1/2001 | Fisel et al. ................ 244/3.16 |

FOREIGN PATENT DOCUMENTS

| | | |
|---|---|---|
| FR | 2 764 402 A1 | 12/1998 |
| GB | 2 021 898 A | 12/1979 |

* cited by examiner

Primary Examiner—Bernarr E. Gregory
(74) Attorney, Agent, or Firm—Allen, Dyer, Doppelt, Milbrath & Gilchrist, P.A.

(57) ABSTRACT

A robotically controlled steerable gimbal mounted virtual broadband hyperspectral sensor system and methods provide a highly mobile, rapidly responsive and innovative system of locating targets and exploiting hyperspectral and ultraspectral imaging and non-imaging signature information in real-time from an aircraft or ground vehicles from overhead or standoff perspective in order to discriminate and identify unique spectral characteristics of the target. The system preferably has one or more mechanically integrated hyperspectral sensors installed on a gimbal backbone and co-boresighted with a similarly optional mounted color video camera and optional LASER within an aerodynamically stable pod shell constructed for three-dimensional stabilization and pointing of the sensor on a direct overhead or off-nadir basis.

34 Claims, 11 Drawing Sheets

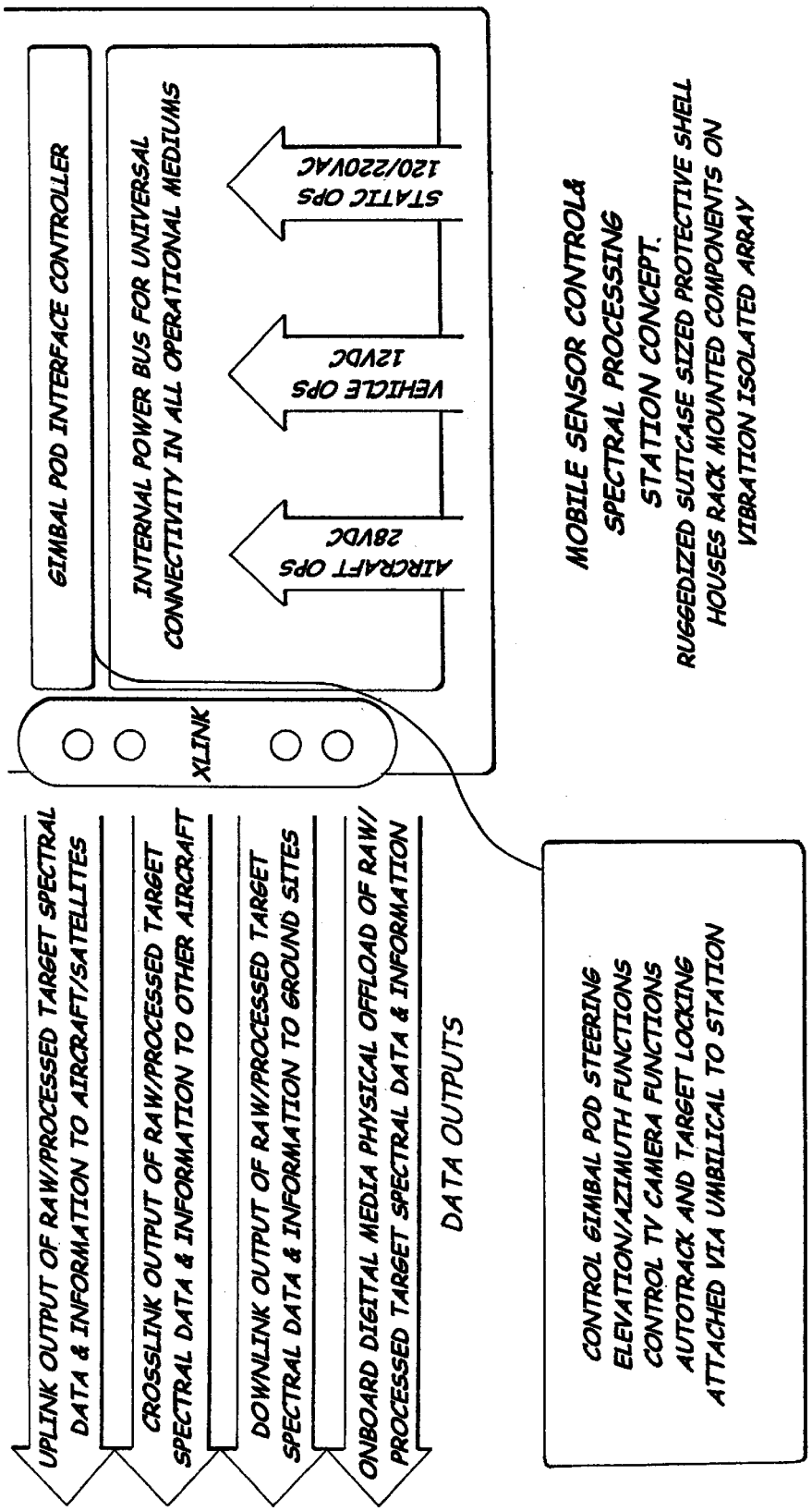
Fig. 11.A

SYSTEM FOR ROBOTIC CONTROL OF IMAGING DATA HAVING A STEERABLE GIMBAL MOUNTED SPECTRAL SENSOR AND METHODS

FIELD OF THE INVENTION

The present invention relates to mobile ground borne or aerial imaging systems and, more particularly, generally to a mobile groundborne and/or airborne pod based system for providing and exploiting accurately geo-referenced spectral digital imagery in real-time and near real-time.

BACKGROUND OF THE INVENTION

It is an accepted perspective for ongoing experimental projects involving imaging spectrometers—operating across all ranges of the electromagnetic spectrum—that hyperspectral and ultraspectral imaging will play a key role in remote sensing. Hyperspectral imaging involves the use of imaging spectrometers to remotely measure two dimensional variations in surface spectral reflectivity. Like hyperspectral imaging technology, ultraspectral utilizes more channels and at narrower channel widths to offer an even finer measurement of spectral data. Hyperspectral and ultraspectral may be referred to as spectral sensors herein throughout. Hyperspectral imaging systems have been developed for locating materials of economic and military value and accurately determining the spatial location and extent of such materials. An example of such a hyperspectral system can be seen in U.S. Pat. No. 6,008,492 by Slater et al. titled "Hyperspectral Imaging Method And Apparatus" (which is commonly owned by the assignee of the present application). An example of another airborne imaging spectrometer can also be seen in U.S. Pat. No. 5,276,321 by Chang et al. titled "Airborne Multiband Imaging Spectrometer." Hyperspectral instruments operating in the various portions of the electromagnetic spectrum, however, have been large, cumbersome, expensive, and not very practical for field operations due to their fixed nadir (a constant orthogonal look angle relative to an aircraft underside or other vehicle position). Scanning mirrors and global positioning systems ("GPS") have also been used to assist with this imaging. These systems, however, remain limited in reaching desired imaging areas and in providing high imaging quality for many different types of applications. Accordingly, there is still a need to enhance imaging by providing additional flexibility and stabilization in such hyperspectral and ultraspectral sensing systems.

SUMMARY OF THE INVENTION

With the foregoing in mind, the present invention advantageously provides a system and methods which utilize select narrow-band, flexible combination narrow-band and/or wideband hyperspectral imaging sensors integrated within a gyrostabilized and steerable gimbal mounted assembly, which permits three axis steering of the sensor, as well as inertial three axis stabilization. In order to apply the advantages of spectral technology in the areas of operation where it is most needed, and in a manner commensurate with the data collection spectral sensors in these areas, the present invention provides a consolidated sensor and gimbal assembly which can operate on a variety of light platforms and provides exploitable information from a practical perspective in a more cost effective basis. The operational level of training skill required is also reduced by the present invention from that of typically a post graduate scientist level to that of someone with only a few weeks of training, such as a technician. The system and methods advantageously provide the ability to respond to terrorist planning and actions with potential chemical/biological weapons in a more rapid and effective manner.

The present invention further provides a two or three dimensional display of the data that can be outputted to a computer monitor display, as controlled from a compact onboard flight station which includes integrated power, data, and computer processing equipment, as well as necessary mechanical interfaces to operate the motion of the steerable gimbal to which the sensors are mounted. A video or other imaging camera is also preferably mounted and co-boresighted within the housing of the steerable gimbal which also has a spectral sensor positioned therein to augment the field of view in order to provide the operator with additional wide frame visual reference for broad area target acquisition and tracking. The camera can also advantageously include auto-track capability for maintaining spectral target tracking once lock on a target area is achieved. The operator can advantageously steer the gimbal via a joystick controller and has control over zoom, pan, and tilt functions to enable exact point fixing and holding within a very small area, as low as within one meter or less, to thereby provide additional information on an exact target within the wide area context. This can be important, for example, for obtaining the ambient physical, tactical and spectral conditions supporting assessment of target spectral data and attempting to quantify false alarms and false negatives.

The spectral sensor is preferably controlled via a separate computer interface for adjusting spectral band settings (number and width) and associated frame rates. When combined with a global positioning system ("GPS") or a differential global positioning system ("DGPS") data, the information from the sensor is displayed with position data to provide extremely precise three dimensional location target specifics relating to the position, shape and mechanical dynamics of the targets, such as moving vapor clouds or surface moving vehicles. Strong consideration has been placed on utilizing low cost commercial and/or off-the-shelf hardware as major components in order to ensure maximum performance, minimum cost, and high reliability. Key emphasis has also been placed on tactical style mobility to obtain maximum value of spectral data in a manner beneficial to military and commercial users.

Off-nadir capability of the present invention provides the ability to increase the cross-sectional area, adjust and continuously fine tune the look angle, and acquire additional physical perspective by the instrument to acquire a more representative sample set from the target. It also allows a more efficient and larger target aspect perspective, thereby permitting selected dedication of onboard processor resources in a more effective manner for fine discrimination once a target has been identified and requires additional scan information. Steering can be accomplished, for example, via azimuth and elevation servos, as understood by those skilled in the art, resulting in complete polar coordinate system coverage. Missions against targets also can be accomplished by the direct manual control of the instrument operator or through automated software programs which utilize GPS and target grid information to automatically slew the sensor toward the target of interest regardless of day/night conditions or operator direct input. The instrument form factor packaging and relative light weight of about 100 lbs allows operation from a variety of air and ground vehicles.

The present invention advantageously creates a completely self contained and tactically useful broadband or combination of narrow band sensors as part of a consolidated spectral robotic sensing system for airborne and groundborne application. Commercial off the shelf technology can advantageously be employed in a unique manner to ensure low cost and robust and simple operation from smaller and more flexible platforms which is necessary for practical fielding of this innovative technical approach to detect a new class of commercial and military targets in a rapid, reliable and effective manner.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF THE PREFERRED EMBODIMENTS

The present invention will now be described more fully hereinafter with reference to the accompanying drawings which illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, the prime notation, if used, indicates similar elements in alternative embodiments.

FIGS. 1–11 illustrate a robotically controlled steerable gimbal mounted virtual broadband spectral sensor system according to the present invention which provides a highly mobile, rapidly responsive and innovative system of locating targets and exploiting hyperspectral and ultraspectral imaging and non-imaging signature information in real-time from an aircraft or ground vehicles from overhead or standoff perspective in order to discriminate and identify unique spectral characteristics of the target. The system preferably has one or more mechanically integrated hyperspectral or ultraspectral sensors, as understood by those skilled in the art, installed on a gimbal backbone and co-boresighted with a similarly optional mounted color video camera and optional LASER within an aerodynamically stable pod shell or housing, such as provided by FLIR Systems, Inc. of Portland, Oregon (and the United Kingdom), constructed or customized for three-dimensional ("3D") stabilization, spectral sensor interfacing, and pointing of the sensor on a direct overhead or off-nadir basis. Use of combinations of spectral sensors configured in this manner enables wider coverage of spectral frequency bands on a precision spatial basis by overcoming spectral coverage limitations inherent in typical band dedicated spectral sensor system to form an "extended" spectral range sensor utilizing simultaneously co-registered summed data on a broadband basis as acquired from a series of individual sensors.

The underlying hyperspectral imaging technology, as described above, of the system of the present invention is used to identify spectral signatures associated with a broad range of target classes, such as vegetative, agricultural, environmental, marine, mineral, soil, law enforcement, military tactical, intelligence operations, and airborne gases/vapors/aerosols and to register and store hyperspectral emission and absorption band data to enable identification of unique target signature data. To identify the target gas/vapors, this spectral data can be compared against known spectral databases, or utilize relative differences within a given target set to assist the operator or analysis in establishing the appropriate "fingerprint" of the targets of interest.

Figure 1:
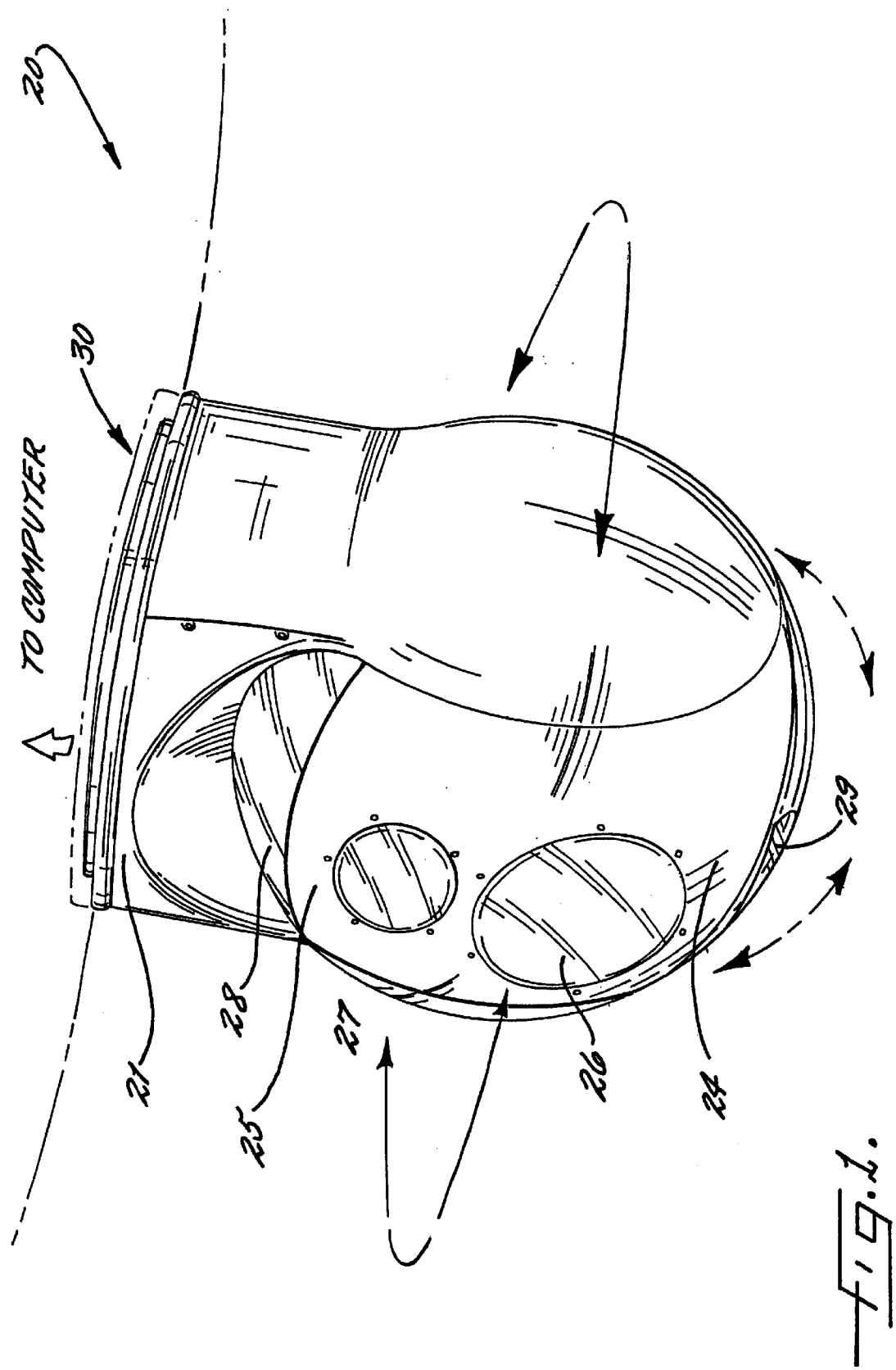
FIG. 1 is a perspective view of a pod-based, gimbal mounted hyperspectral sensor housing of a system for robotic control of imaging data according to the present invention.
Figure 2:
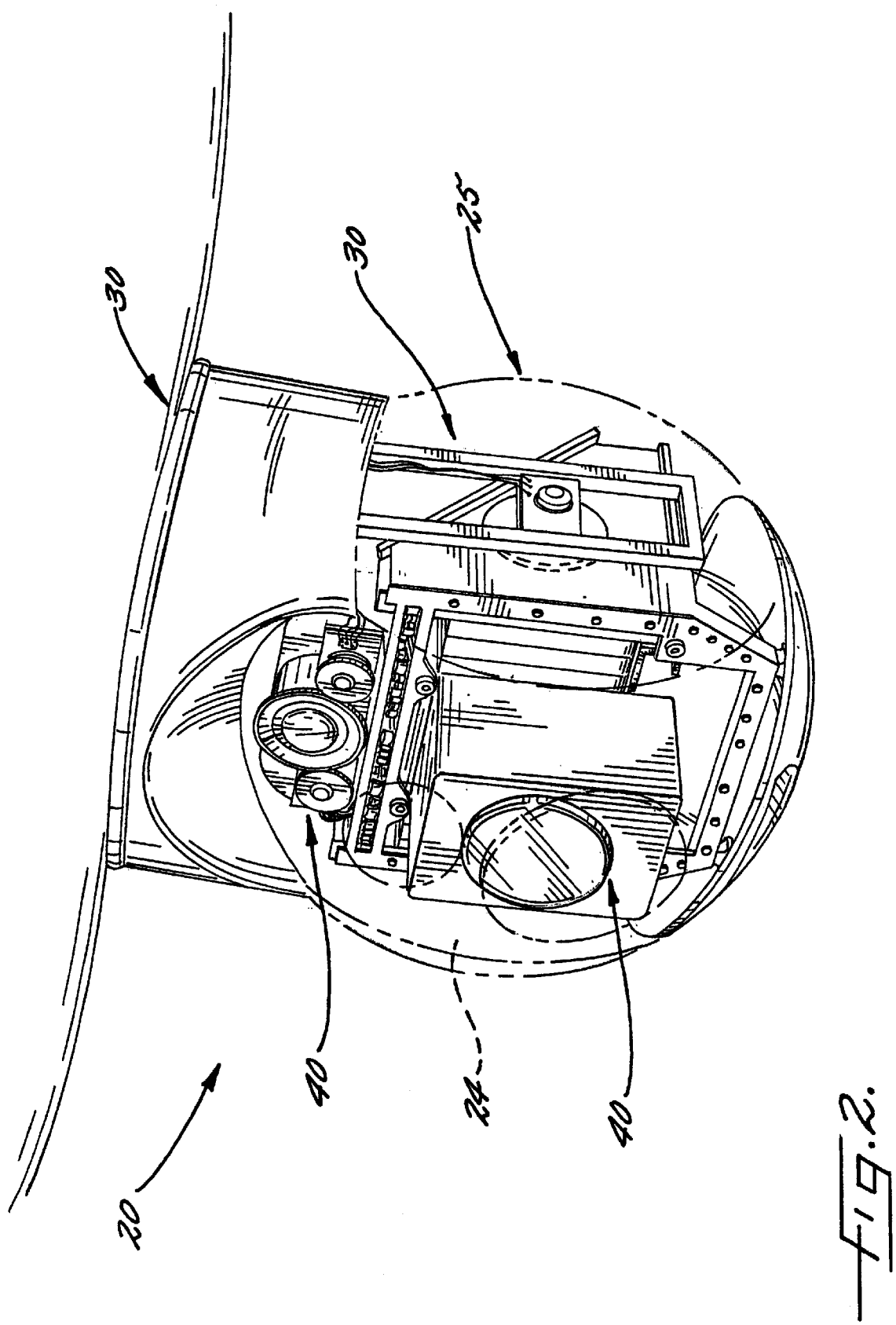
FIG. 2 is a fragmentary perspective view of a pod-based, gimbal mounted hyperspectral sensor housing having a hyperspectral sensor and a video camera mounted therein of a system for robotic control of imaging data according to the present invention.

The system preferably has a 3-axis gyro-stabilized gimbal so that an operator can manually steer the device in a robotic manner via servo mechanisms through instantaneous control inputs, e.g., from a joystick or other user interface, to acquire, identify and track emerging targets of interest. When mounted on an aircraft or ground vehicle, changes in gas target state and position can be tracked and analyzed in a dynamic field operating environment for use in challenging military and/or commercial applications. The pod housing 25 of the system, as shown in FIGS. 1–2, preferably includes gyrostabilization which offers vibration protection for the sensors, reduces distortions induced by uncommanded platform perturbations and results in a useful picture for acquiring long range standoff data.

The ability to operate on an off-nadir basis is a first in the field of hyperspectral imaging, and is greatly further enhanced by adding steerability and tracking capabilities to what has previously been essentially "straight down" viewing. The ability to apply spectral sensor imagery against a target offers extreme increase in system identification capabilities through the increase in the apparent aspect angle, such as would be the case in looking at a plume on the horizon instead of straight down, as well as the ability to more effectively utilize limited onboard processing resources. In the case of the latter, hyperspectral data collection typically requires high data rates (by present day standards). The ability to track a particular point or area target allows the operator to selectively remove the extraneous data from the collected scene, resulting in the freeing up of the processor and software and remove the unnecessary information (and resource intensive non-essential background data) from the scene and focus primarily on the target. Conversely, as necessary, the operator may wish to pan back from the target to acquire background information in making spectral analysis assessments.

The flexibility of off-nadir steerability also permits highly mobile tactical advantage in pursuing moving targets—such as enemy tactical forces or opposition narco traffickers—in getting down to the tree-tops accomplish slant angle imaging through the trunks of tree and see targets that may be visible from this slant angle which would not be visible from looking straight down. In commercial type operations, use of off-nadir offers the high advantage of permitting low altitude operation in order to look sideways through smokestack gas plume in order to orbit the plume while maintaining target track, or perhaps take into account lower sun angles and fly more hours during the day. This results in a clearer contrast of the target signature against a more relatively uncluttered sky, resulting in much more consistent spectral data. This orbital approach also permits use of three-dimensional ("3D") construction techniques to develop cloud dynamics models and permit real-type pursuit and tracking of gases, such as might be required after a gas release mishap. This results in means for real-time gas identification and tracking for use in military and commercial environments.

In order to overcome possible operator disorientation while operating the instrument, resulting from the non-familiar environment of possible non-intuitive spectral imagery, the instrument is equipped with a co-boresighted high resolution color TV, or video camera to provide littoral reference to the conventional appearance of the world from the perspective of human eyes.

Figure 4:
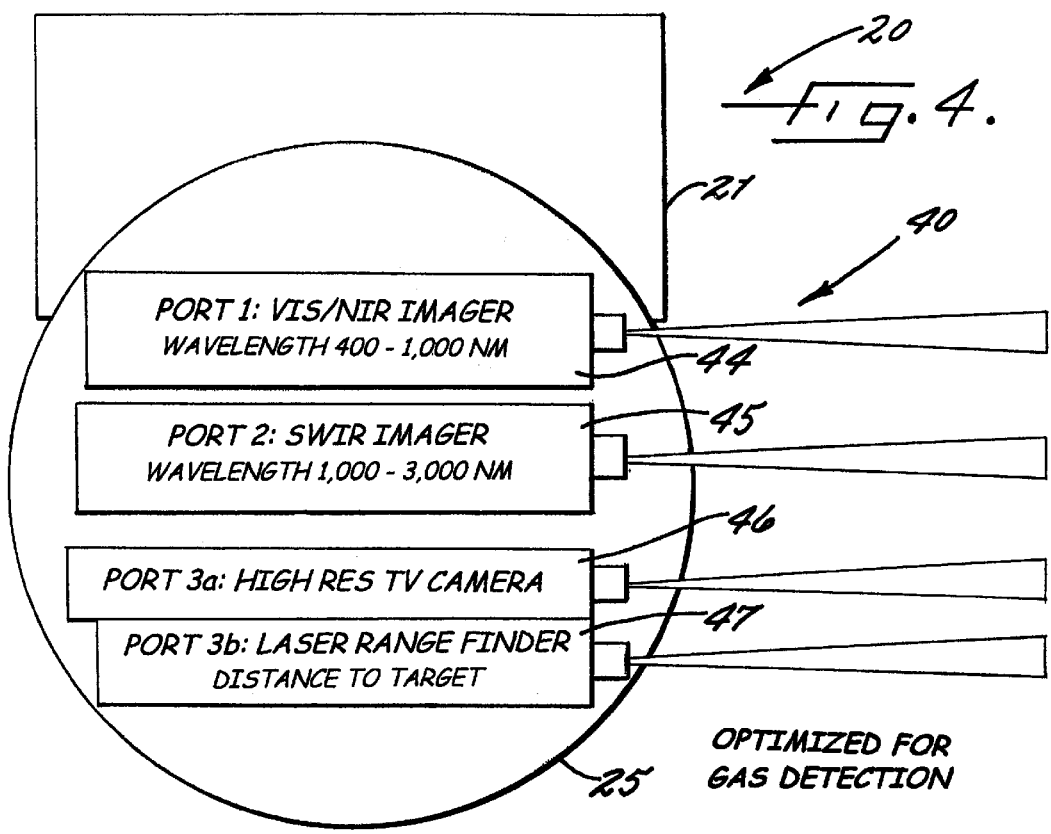
FIGS. 4–6 are schematic diagrams of the system having a hyperspectral visible near infrared (VIS/NIR) sensor, hyperspectral short-wave infrared (SWIR) sensor, TV camera and LASER and other possible sensor modular combinations, including, but not limited to, use of a midwave thermal (MW) sensor and long wave thermal (LW) sensor of a system for robotic control of imaging data according to the present invention.
Figure 5:
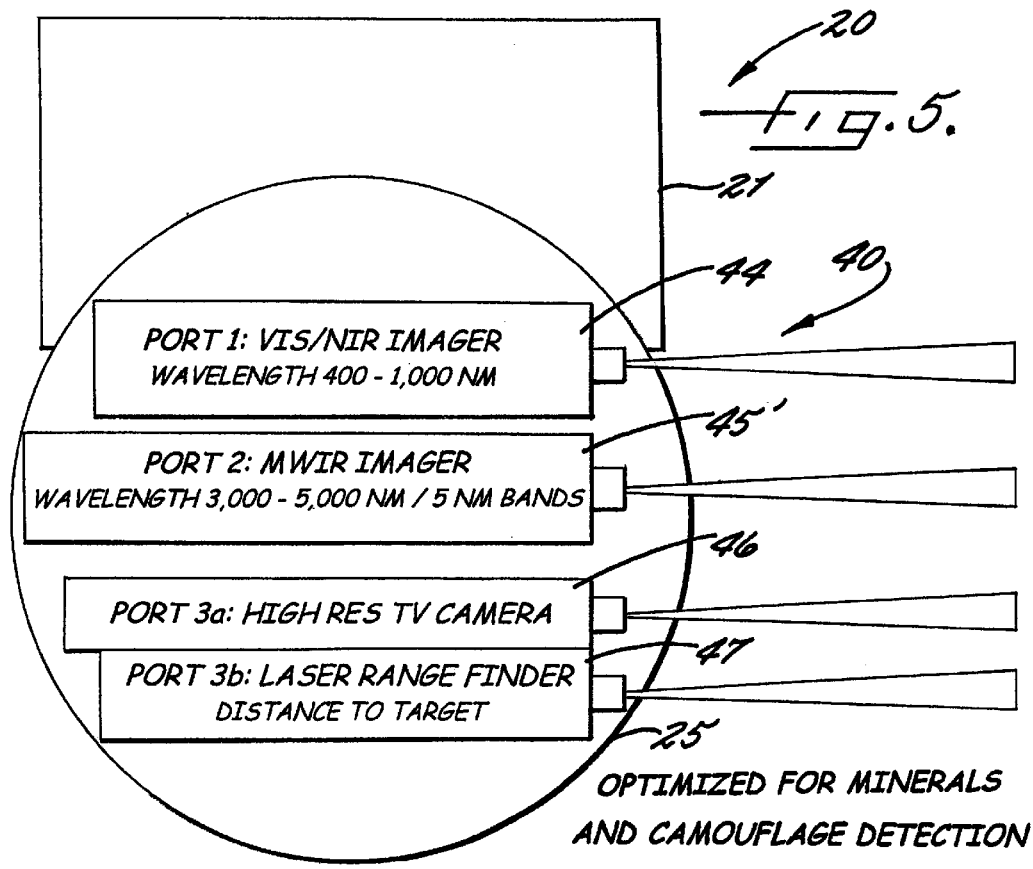
Figure 6:
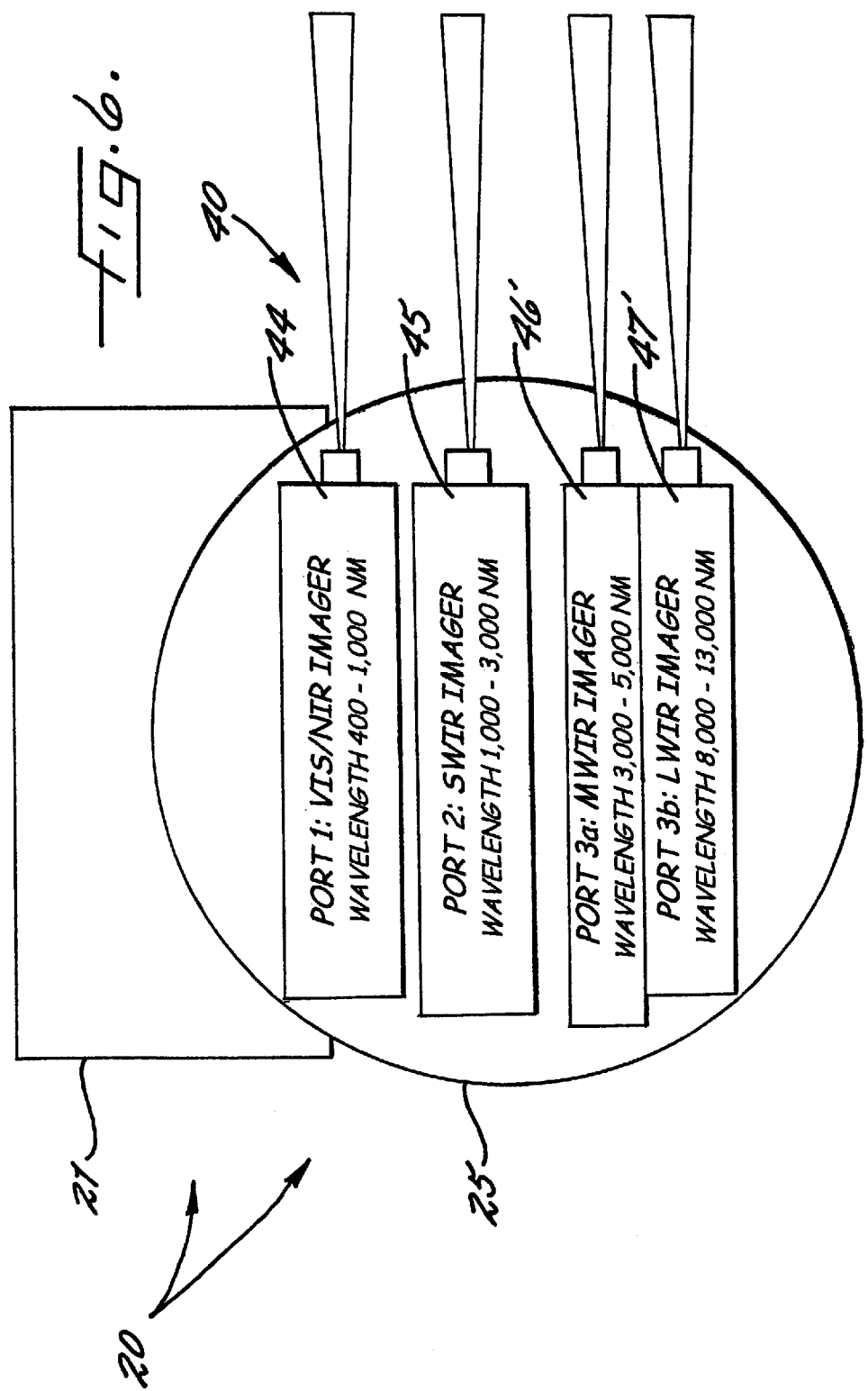

The system 20 is preferably constructed in a modular manner, e.g., a pod-based housing 25, to accommodate several classes of hyperspectral or ultraspectral sensors 40 for optimal use in selected portions of the spectrum, such as VIS/NIR for agricultural and vegetative applications, SWIR for minerals and camouflage materials detection, and mid-wave (MW)/long-wave (LW) for gas/vapor/aerosol presence and content exploitation (see also FIGS. 4–6). In the case of the latter, a LASER (operating across any number of available wideband frequencies) is also optionally mounted within the suite and co-boresighted in order to fluoresce targets and measure changes in the return spectral signature for both calibration of the passive hyperspectral sensor data, as well as exploitation of the data contained within the changes of the return signature itself.

The system 20 of the present invention advantageously allows for gathering and tracking images. The system 20 preferably includes a vehicle mounting interface 21 positioned to be connected to a vehicle. The vehicle mounting interface includes a remotely steerable gimbal 30 which provides at least two axis of pivotal or rotational movement. A compact pod housing 25 is pivotally mounted to the vehicle mounting interface 21 and has at least one window 26, and more preferably a plurality of windows 26,27,28,29 as illustrated in FIGS. 1–6. A spectral sensor 40 is positioned on the steerable gimbal 30 within the pod housing 25 to thereby enable off-nadir scanning, target acquisition, target tracking and analysis of spectral data through the at least one window 26 of the pod housing 25.

The at least one window 26 is preferably high efficiency spectral frequency matched with a sensor port 32 of the spectral sensor 30 to permit optimal passage of frequency selected electromagnetic radiation to a detector of the selected spectral sensor within a pod bay 23 of the housing 25. The pod housing 25 preferably includes an external shroud 24, and each of a plurality of windows 26,27,28,29 are modular and inter-changeably mounted high efficiency spectrally transmissive windows associated with the external shroud 24 of the pod housing to permit a mission specific and quick turnaround changeover of a sensor configuration and associated window assemblies.

The system 20 also has at least one external data control computer 15 (see FIG. 3), e.g., a laptop or other personal computer as understood by those skilled in the art, such as a Toshiba high performance brand with a high degree of random access memory ("RAM"), i.e., one Gigabyte, in communication with the steerable gimbal 30, e.g., through a data interface or port, and having means responsive to the hyperspectral sensor 40 for enabling sustained dwell time from fixed or moving platforms toward fixed or moving targets in order to increase the spectral and spatial information obtained from extended dwell time resulting from the ability to maintain precision real-time track and therefore collect more valuable data. The enabling means can be a part of the processing hardware and software from the computer 15, or can be separate. The computer preferably has or uses "Envi" spectral processing software by Research Systems, Inc. of Boulder, Colo. which is hereby incorporated herein by reference in its entirety along with published and current operational manuals for the software at the time of this filing (see also FIG. 11). At least portions of the steerable gimbal 30 are positioned within the compact pod housing 25, and the pod housing 25 has a plurality of spectrally transmissive glass windows 26,27,28,29 to permit efficient passage of electro-magnetic ("EM") radiation directly to a corresponding plurality of hyperspectral or ultraspectral sensors 40 positioned to sense imaging data through the plurality of windows 26,27,28,29 in desired wavelength regions when positioned within the housing 25.

Figure 3:
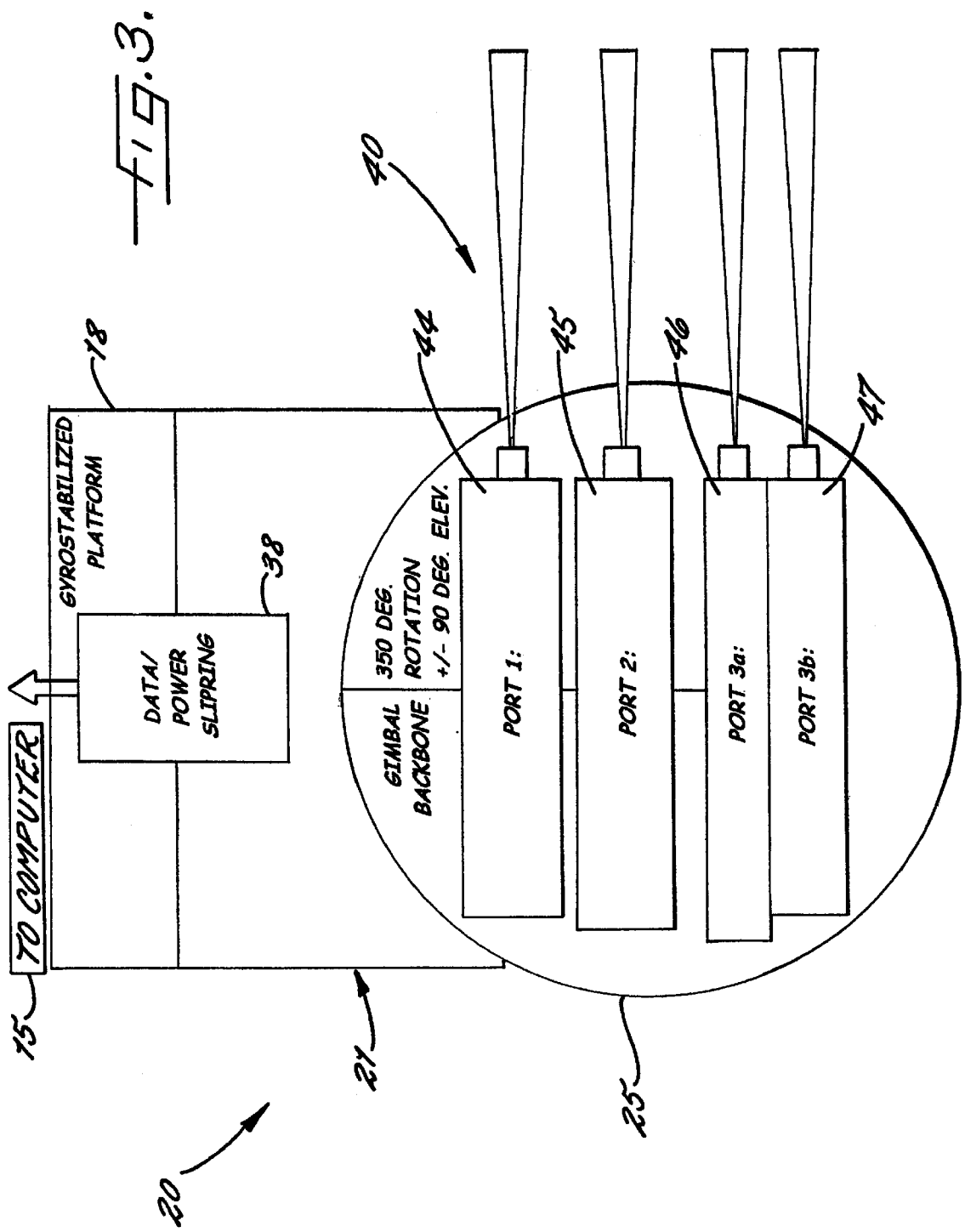
FIG. 3 is a schematic block diagram of a basic instrument configuration showing the external pod containing the gimbal with steering and gyrostabilization components, and general control elements of a system for robotic control of imaging data according to the present invention.

As shown in FIGS. 1–3, the steerable gimbal is mounted to a gyrostabilized platform 18, as understood by those skilled in the art, to remove/reduce motions induced by turbulence and jitter and vibration resulting from movement of a vehicle to which it is mounted. The pod housing 25 is environmentally sealed and has vibrationally protected medium in order to transition hyperspectral test sensors 40 and other systems to air and field operations without the need to individually ruggedize the sensors 40. The pod housing 25 has a plurality of sensors 44,45,46,47 which can be of various desired types (see FIGS. 4–6) positioned therein and responsive to the at least one external computer 15 to thereby form a combination of a number of discrete narrow band sensors 40 operating in concert as a larger single consolidated wideband type system 20.

The vehicle V to which the system 20 attaches preferably includes at least one of the following: a fixed wing aircraft, such as illustrated, a rotary wing aircraft, an unmanned aerial vehicle ("AV"), an unmanned ground vehicles ("UGV"), an underwater and surface water remotely operated vehicles ("ROV"), a balloon, an airship platform, a conventional surface mobile vehicle, and a spacecraft as understood by those skilled in the art.

Each of the plurality of sensors 40 are positioned within ports (1–3b) and readily detachable and removable from the pod housing 25 to thereby provide built-in scalability for changing out spectral sensors 40 on a simplified and cost effective basis as technology advances. Each of the plurality of sensors 40 are selected to optimize mission specific applications.

Figure 9:
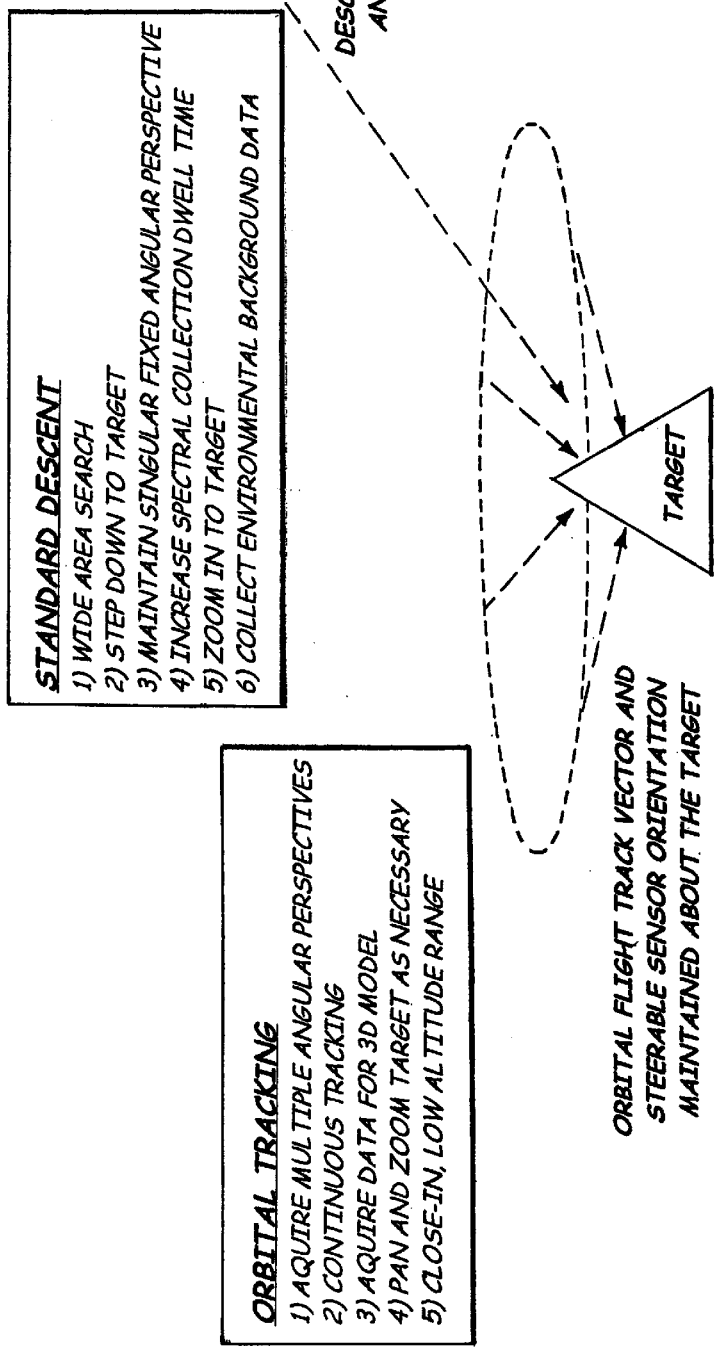
FIG. 9 is a schematic view of flight operations with use of a system for robotic control of imaging data according to the present invention.
Figure 10:
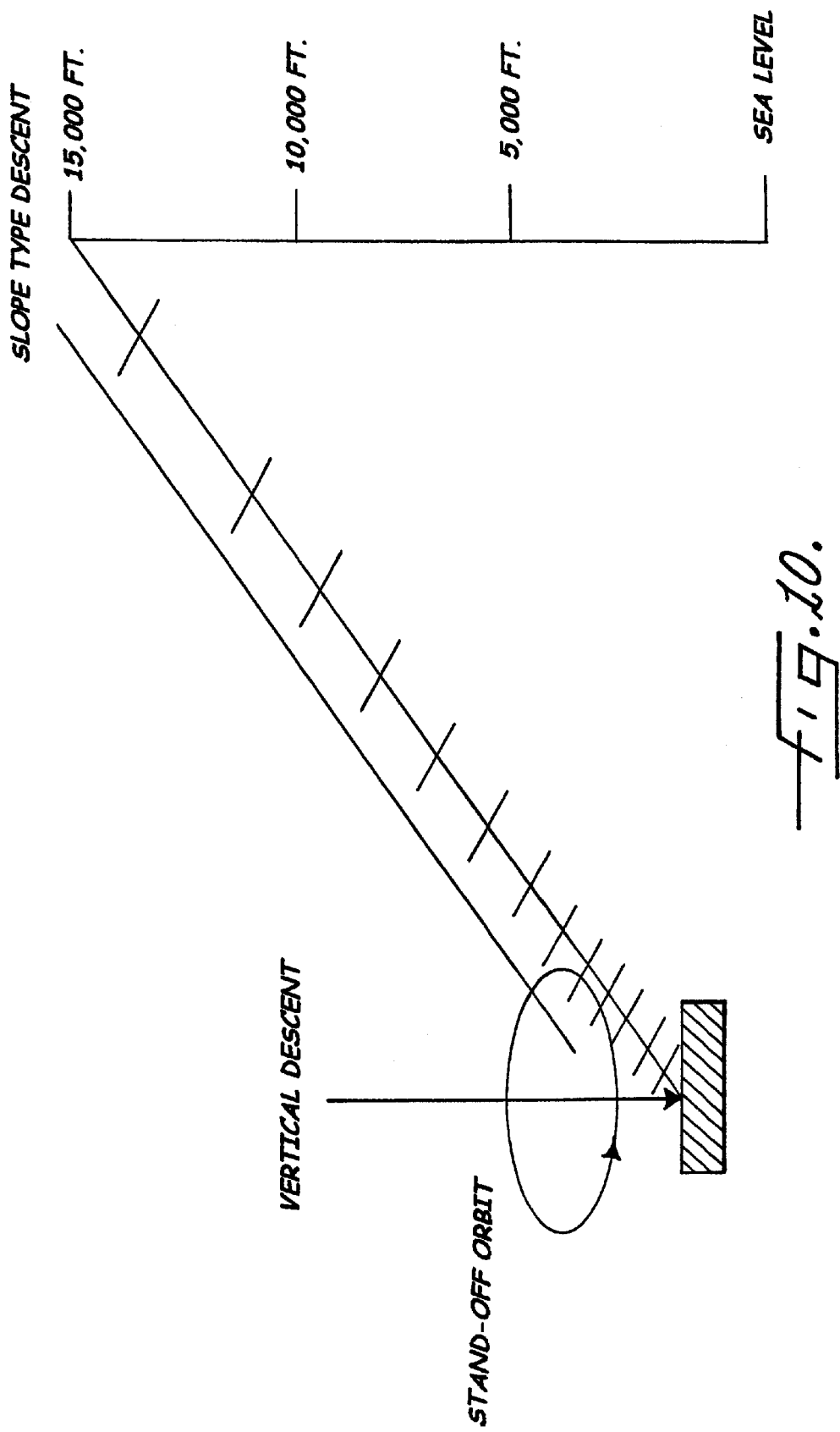
FIG. 10 is a schematic graph of standoff approach vectors with use of a system for robotic control of imaging data according to the present invention.
Figure 11:
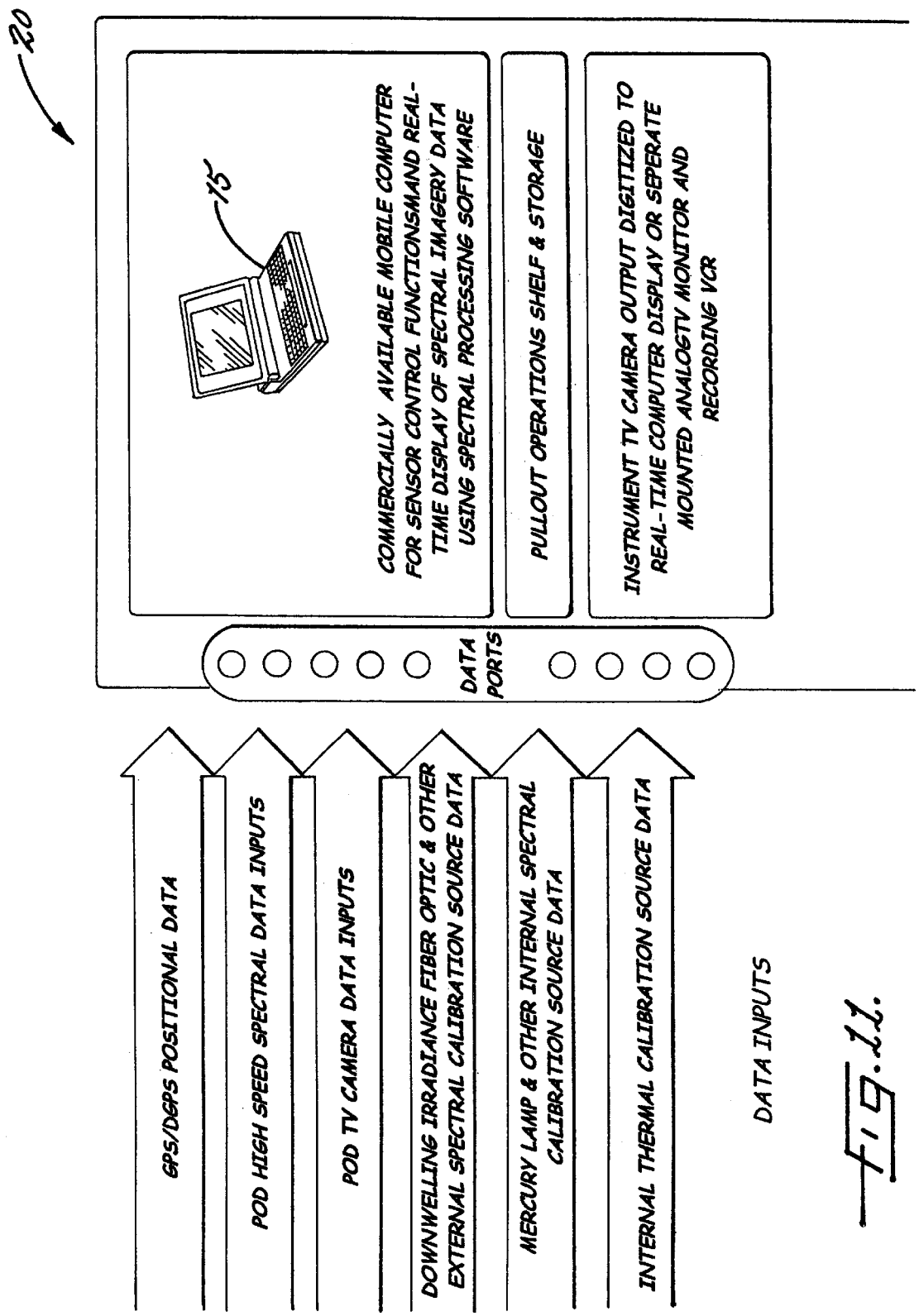
FIG. 11 is a schematic diagram of a vehicle interface and robotic control for a system for robotic control of imaging data according to the present invention.

As perhaps best shown in FIGS. 9–11, the system 20 also has robotic controlling means, e.g., user interface with the gimbal 30 and processing software as described above, connected to the steerable gimbal 30 for controlling the seeking and tracking of targets in real-time without the need to process data from the sensor 40 to identify the original targets. The robotic controlling means can include portions, e.g., software and interface, of the external computers. A high capacity digital cable is preferably connected from the vehicle interface 21 and steerable gimbal 30 to the computer 15. The cable can be customized or optimized for various types of communication standards as understood by those skilled in the art.

A video camera (see FIGS. 4–5) can also advantageously be co-boresighted within the pod housing to maintain real-time littoral and human intuitive perspective of the spectral data as it is being collected in familiar and unfamiliar operational environments. The system 20 can also include three-dimensional image constructing means, e.g., as part of the software, positioned to receive the imaging data for constructing three-dimensional ("3D") spectral and spatial image and target scenes using data collected from the plurality of sensors 40 by virtue of obtaining precision multiple perspectives about a given target resulting from the ability to move about a given point or set of points, maintain relative orbit, maintain constant track, conduct target pursuit, and maintaining target lock while changing relative target aspect.

The system 20 can still further include processing means, e.g., software and hardware computer processors, responsive to the hyperspectral sensor 40 for processing global positioning system ("GPS") and differential global positioning system ("DGPS") data to compute spectral sensor location in concert with onboard spectral gimbal geometry for determining and accomplishing automatic tracking against ground targets or via programmed inputs so that the spectral pod steers itself. The processing means preferably includes means for using a multi-dimensional, e.g., two or three dimensional, moving map display of a physical area to graphically display the location of the spectral sensor pod 25, orientation of the sensor array 40 and relative target location by tying in known position inputs, such as GPS/DGPS, to display a multi-dimensional target model of past, ongoing and future instrument mission operations highlighting display overlay of the collected and exploited spectral data over the simulated terrain, thereby providing a more intuitive and littoral interpretation of the context of the spectral data.

The processing means, for example, can be or include the external computer 15 having a display connected thereto, and the processing means preferably further includes computer graphic user interface ("GUI") display "windows" associated with the computer and the display to simultaneously display and control multiple spectral sensor data sets as the sets are acquired from various spectral band regions of interest to thereby include GUI display of the live or recorded video camera images.

The hyperspectral sensor 40 preferably also includes a "contactless" capacitance based slipring configuration 38 (see FIG. 3), as understood by those skilled in the art, within the pod housing 25 to permit ultra high data bandpass and ultra high data rates (by today's standards—upwards of two gigabits per second) in order to originate large amounts of data from within the pod internal suite of hyperspectral sensors 40 and then permit the data to travel—as it is collected in real-time—through the critical mechanical elevation and azimuth sliprings of the gimbal pod 25, and through the gyrostabilized mount, for processing by the control station computers, and storage of data or downlink mechanisms.

The processing means still further includes means for using data channel reduction processes for compressing hyperspectral data for purposes of traveling across conventional bandwidth limited direct contact sliprings 38 within the steerable pod 25 for processing of data by the external control station computers 15, means for assisted, facilitated, or automated identification of targets using spectral algorithms to identify anomalous target conditions—or specifically programmed spectral signatures—and then automatically controlling the pod housing 25 based upon this information to point and track at such targets on a non-manual basis as a robotic mechanism, to include commanded activation of target exploitation sequencing processes activating other onboard sensors, video cameras, LASERS and weapons systems, and means for imbedding GPS/DGPS data information within an imaging data stream as the data stream originates and travels from the spectral sensor 40 so that each spectral scene captured by the spectral sensor 40 contains GPS/DGPS data augmenting spectral data.

The LASERS 47 preferably include tunable and fixed frequency LASERS, as understood by those skilled in the art, to fluoresce gas, vapor and aerosol targets, and LASER illumination of solid targets, in order to measure changes in unique spectral absorption or emission return signature data for precision information extraction as a value added processing mechanism for evaluating the changes to the return hyperspectral signatures of targets as measured by the instrument. The tunable and fixed frequency LASERS are preferably also co-boresighted LASERS, as understood by those skilled in the art, to calibrate spectral atmospheric and solar conditions at the time of collection by using a known series of fixed and tuneable LASER wavelengths to measure changes in the measurement transmission medium in order to convert the spectral data to absolute standards of percentage reflectance which enables universal standard of calibrated spectral data. A co-boresighted and/or co-mounted LASER range finder, e.g., as part of the LASER and/or software, is positioned to measure exact distance from sensor to target in order to provide enhanced ground spatial distance and detailed sizing information to assist in computing the exact size of targets in spectral image scenes.

The system 20 can include the steerable gimbal 30 having means for controlling point line scanner and whiskbroom and pushbroom type spectral sensors for off-nadir fixed wide area survey and imaging type missions. These types of sensors 40 require forward aircraft motion compensation (velocity over height aka V/H) as part of the image acquisition process. This can include use of the gimbal pod housing 25 for adjusting off-nadir look angles in flight and then operating these types of instruments in a set "fixed" mode for sustained wide area fixed slant angle aerial strip type imaging operations.

The system 20 defines a consolidated portable mobile spectral processing station which contains all necessary sensor control elements, mobile computing elements, spectral data inputs, calibration inputs, spectral processing software, data recording and storage of collected spectral field information acquired by the hyperspectral sensor in air and ground environments for real-time or near-real time output of processed data to other users, platforms, systems and locations.

By having the flight and vehicle operational capabilities as shown and described in FIGS. 1–3 and 9–10, the present invention further provides an overhead/standoff spectral imaging system 20 which includes the following capabilities;

1) Counter-terrorism. The system 20 has fast reaction capability for "first responders" discriminates anomalous chemical and biological release gases associated with unconventional terrorist activities in urban areas in prevention and response scenarios. It can also be used abroad in seeking to identify and neutralize terrorist training and staging facilities where pre-cursor chemical biological materials are processed and/or stored on-site.
2) Counter-proliferation of Weapons of Mass Destruction. The system 20 has highly mobile tactical and intelligence collection capability identifies and discriminates pre-cursor materials used for certain weapons of mass destruction (WMD). The dual use single air/ground packaging enables close-in operation from light aircraft and ground vehicles in otherwise inaccessible environments and a new level of intelligence information detail against hostile elements and traffickers.
3) Counter-narcotics Detection and Interdiction. The system 20 also has day/night capability to survey jungle areas for vapors emitted from pre-cursor chemicals used by narcotics producers for certain types of coca, heroin and opium production. It also enables more efficient interdiction through better intelligence and precision location.
4) Industrial Effluent and Fugitive Gas Identification. This portion of the system 20 measures plume contents from industrial sources for environmental and safety compliance.
5) Rocket and Exhaust Gas Plume Tracking. The fieldable capability of the system 20 tracks movement of rockets based upon thermal signatures and distinctive composition, which can be especially useful for discriminating an incoming SCUD missile exhaust signature coming within protected a US theater of operation.
6) Debris cloud of exploded materials tracking and analysis. A highly mobile and interactive method is provided for tracking the changing plume associated with the post event cloud mechanic of a recently exploded rocket or missile. By mounting in a pursuit chase aircraft, it is possible to achieve various look angles to develop a dynamic perspective for spectral analysis predictive modeling of the cloud, such as may be necessary for alerting a civilian populace to the size, speed and content of an incoming cloud. The system 20, for example, preferably includes three-dimensional image constructing means positioned to receive the imaging data for constructing three-dimensional ("3D") spectral and spatial image and target scenes using data collected from the plurality of sensors by virtue of obtaining precision multiple perspectives about a given target resulting from the ability to move about a given point or set of points, maintain relative orbit, maintain constant track, conduct target pursuit, and maintaining target lock while changing relative target aspect (i.e., circle the target and image all sides—think about chasing gases after a rocket blows up and the noxious cloud is heading toward a city).
7) Search and Rescue—The system 20 also provides identification of fugitive gases from damaged facilities after a mishap, such as an earthquake, where determination of the constituent chemical gases/vapors being released may allow authorities to prioritize recovery efforts and minimize further loss of life and property is also provided.
8) Vegetative Assessment—The system 20 also provides identification of vegetative blight, disease, distress and cankers which demonstrate unique bio-spectral characteristics and changing signatures as a function of various distress levels and pathogen life cycles.
9) Mineral Exploration—The system 20 can conduct a wide area survey and focus down to selected areas of interest as the mission or survey is underway to highlight geologic exploration.
10) Environmental Enforcement. The system 20 provides the ability to selectively install and operate any combination of spectral sensors within the steerable suite enables a more powerful broad range collection capability. Installing two or more discrete sensors, e.g., 44,45, 46,46',47,47', each with its own segment of operation within the electromagnetic (EM) spectrum results in effectively collecting data as if from a single wideband instrument. This approach overcomes technology hurdles inherent with frequency bandwidth limitations of today's' spectral sensors.

For example, as shown in FIGS. 4–6, a VIS/NIR sensor, as understood by those skilled in the art, installed in parallel in the sensor with a SWIR would yield a continuous range of collected data across the resulting sum of the individual sensor ranges, while still benefitting from the high spectral/spatial resolution typically provided by individual discrete range sensors. The resulting output from this configuration in a tactical application would be the ability to seek anomalous vegetative conditions associated with efforts at ground target camouflage and concealment.

Another example might be a commercial environmental application where vegetative distresses are noted by the VIS/NIR sensor (an ideal use of VIS/NIR) for measuring vicinity changes around a suspected industrial polluter. While flying the same mission segment, use of the co-mounted MW or LW sensor segment would also be able to target specific composition of thermal gases and vapors emitted from the suspect facility, thereby offering a more enhanced and valuable picture of the activities of the plant. In order to obtain reference data—to enable measurement in terms of percent reflectance, which may be used for absolute analysis—for all the objects within the spectral scenes. Additional spectral calibration for solar and atmospheric conditions is acquired through use of a co-located downwelling irradiance sensor, which runs via a separate lead outside the gimbal to an upward facing portion of the instrument host platform.

Figure 7:
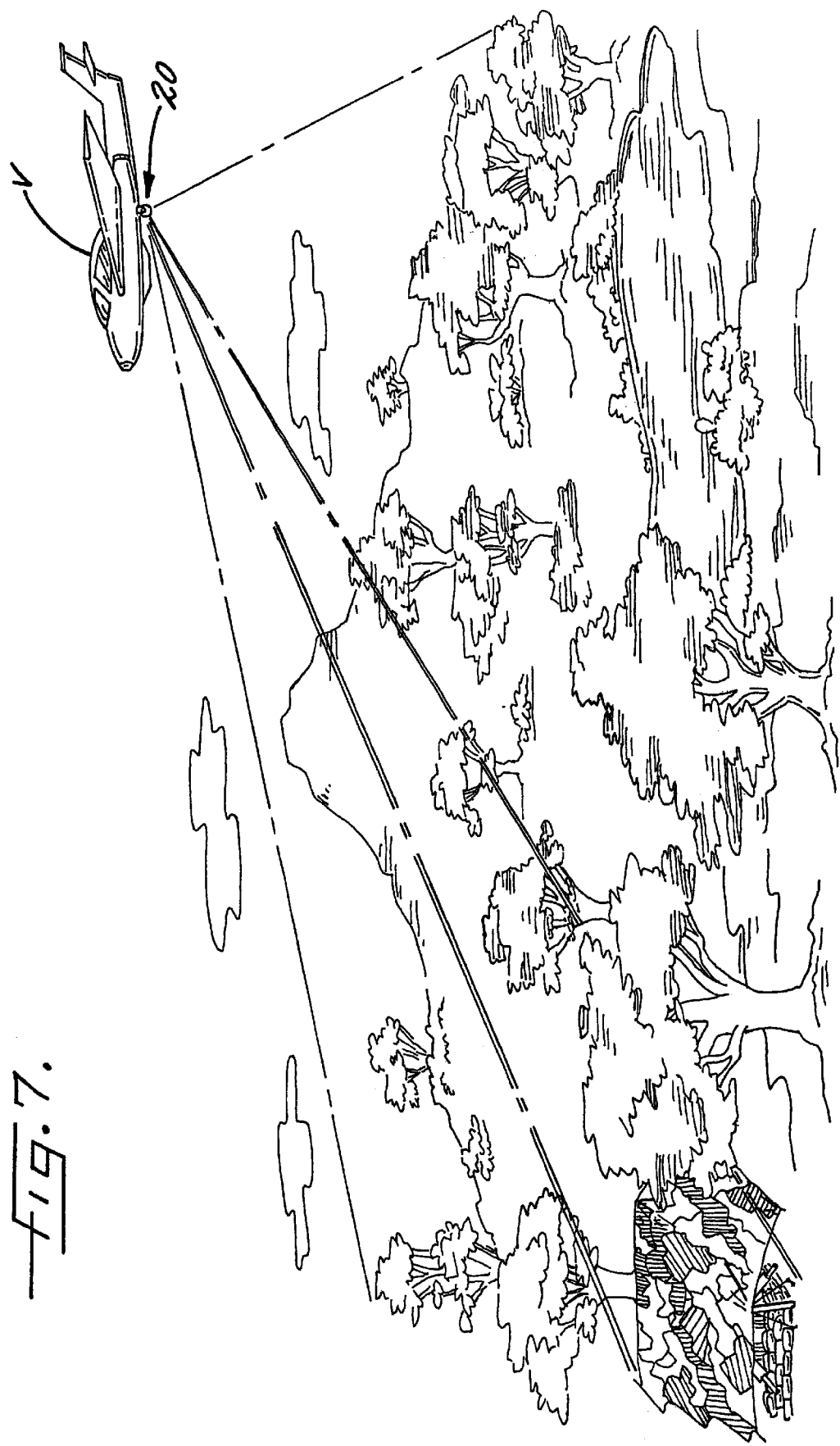
FIG. 7 is an environmental view of a system for robotic control of imaging data mounted to an airplane and operating within a sample mission environment to thereby demonstrate the utility of overhead and off-nadir steerable tracking for hyperspectral imaging according to the present invention.
Figure 8:
FIG. 8 is an environmental view of a system for robotic control of imaging data mounted to a land based moving vehicle and operating within a sample mission environment to thereby demonstrate the utility of overhead and off-nadir steerable tracking for hyperspectral imaging according to the present invention.

The system 20 is advantageously compact and portable in nature, enables installation and operation from aircraft V, helicopters, unmanned aerial vehicles, ground mobile vehicles V and fixed point locations (see FIGS. 7–8). The system 20 utilizes a spherical pod design to minimize aerodynamic drag forces to ensure balance of the unit, while at the same time providing a protected and sealed environment to house the internal hyperspectral or ultraspectral sensors 40. The pod housing 25 can advantageously contain any number of spectral window ports (ports 1–3*b*), but for brevity and clarity only a system 20 having one, two, three and four windows 26,27,28,29 are described and shown herein. The inter-platform 18 operability within a sensor matrixed configuration is especially beneficial in military and intelligence operations where high value is placed on quick response preparation, implementation and results. The approach is analogous to use of field mission-selected combinations of munitions by air combat crews when outfitting fighter/bomber aircraft to operate against a particular enemy target at a certain stage or goal of the campaign. This operability of spectral sensors 40 is leveraged similarly by taking advantage of the spectral characteristics of a target for matching with the best sensor instrument fit within the consolidated robotic pod housing 25 to achieve a given mission or commercial means for flight operations perspective and stand off approach (as shown in FIGS. 9–11).

A method for sensing imaging data according to the present invention is provided which includes detecting imaging data via use of a spectral sensor mounted to a steerable gimbal to conduct wide area spatial and spectral searches and using the resulting feedback information or data to dynamically tune down to ever more increasing levels of spectral and spatial detail to locate and analyze objects of interest for various applications as described and claimed herein.

FIGS. 1–11 also describe methods of sensing imaging data, as illustrated and described above as well, and increasing available flight time per day for aerial imaging of data. A method of increasing available flight time per day, for example, preferably includes using off-nadir spectral imaging by undertaking flight operations by steering new slant look angles which enable maximum pointing of a hyperspectral sensor away from the sun to effectively acquire a steady and consistently illuminated spectral scene to thereby enabling earlier missions and later missions. Current spectral sensors are limited a few hours plus or minus solar noon due to their fixed nadir configuration. This counter-solar aspect results from the ability to operate a steerable pod and to adjust the aspect slant angle to target based upon changing light conditions on the fly.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That claimed is:

1. A system for gathering and tracking images, the system comprising:
   a vehicle mounting interface positioned to be connected to a vehicle, the vehicle mounting interface including a steerable gimbal which provides at least two axis of pivotal or rotational movement;
   a compact pod housing pivotally mounted to the vehicle mounting interface and having at least one window; and
   a spectral sensor positioned on the steerable gimbal within the pod housing to thereby enable off-nadir scanning, target acquisition, target tracking and analysis of spectral data through the at least one window of the pod housing.

2. A system as defined in claim 1, further comprising at least one external data control computer in communication with the steerable gimbal and having means responsive to said spectral sensor for enabling sustained dwell time from fixed or moving platforms toward fixed or moving targets in order to increase the spectral and spatial information obtained from extended dwell time resulting from the ability to maintain precision real-time track and therefore collect more valuable data.

3. A system as defined in claim 2, wherein the pod housing has a plurality of additional sensors positioned therein and responsive to said at least one external computer to thereby form a combination of a number of discrete narrow band sensors operating in concert as a larger single consolidated wideband type system.

4. A system as defined in claim 3, wherein each of the plurality of sensors are readily detachable and removable from the pod housing to thereby provide built-in scalability for changing out spectral sensors on a simplified and cost effective basis as technology advances.

5. A system as defined in claim 3, wherein each of the plurality of sensors are selected to optimize mission specific applications.

6. A system as defined in claim 3, further comprising three-dimensional image constructing means positioned to receive the imaging data for constructing three-dimensional spectral and spatial image and target scenes using data collected from the plurality of sensors by virtue of obtaining precision multiple perspectives about a given target resulting from the ability to move about a given point or set of points, maintain relative orbit, maintain constant track, conduct target pursuit, and maintaining target lock while changing relative target aspect.

7. A system as defined in claim 2, wherein said spectral sensor includes a contactless capacitance based slipring configuration within the pod housing to permit ultra high data bandpass and ultra high data rates in order to originate large amounts of data from within the pod internal suite of spectral sensors and then permit the data to travel—as it is collected in real-time—through the critical mechanical elevation and azimuth sliprings of the gimbal pod, and through the gyrostabilized mount, for processing by the control station computers, and storage of data or downlink mechanisms.

8. A system as defined in claim 7, wherein said processing means includes means for using data channel reduction processes for compressing spectral data for purposes of traveling across conventional bandwidth limited direct contact sliprings within the steerable pod for processing of data by the external control station computers.

9. A system as defined in claim 7, wherein said processing means includes means for assisted, facilitated, or automated identification of targets using spectral algorithms to identify anomalous target conditions or specifically programmed spectral signatures and then automatically controlling the pod based upon this information to point and track at such targets on a non-manual basis as a robotic mechanism, to include commanded activation of target exploitation sequencing processes activating other onboard sensors, video cameras, LASERS and weapons systems.

10. A system as defined in claim 9, wherein the LASERS include tunable and fixed frequency LASERS to fluoresce gas, vapor and aerosol targets, and LASER illumination of solid targets, in order to measure changes in unique spectral absorption or emission return signature data for precision information extraction as a value added processing mechanism for evaluating the changes to the return spectral signatures of targets as measured by the instrument.

11. A system as defined in claim 10, wherein the tunable and fixed frequency LASERS are co-boresighted LASERS to calibrate spectral atmospheric and solar conditions at the time of collection by using a known series of fixed and tuneable LASER wavelengths to measure changes in the measurement transmission medium in order to convert the spectral data to absolute standards of percentage reflectance which enables universal standard of calibrated spectral data.

12. A system as defined in claim 11, further comprising a co-boresighted LASER range finder to measure exact distance from sensor to target in order to provide enhanced ground spatial distance and detailed sizing information to assist in computing the exact size of targets in spectral image scenes.

13. A system as defined in claim 1, wherein at least portion of the steerable gimbal are positioned within the compact pod housing, and wherein the pod housing has a plurality of spectrally transmissive glass windows to permit efficient passage of electro-magnetic radiation directly to a corresponding plurality of spectral sensors positioned to sense imaging data through the plurality of windows in desired wavelength regions when positioned within the housing.

14. A system as defined in claim 13, wherein the pod housing is environmentally sealed and has vibrationally protected medium in order to transition spectral test sensors an other systems to air and field operations without the need to individually ruggedize the sensors.

15. A system as defined in claim 13, wherein the pod housing includes an external shroud, and wherein each of the plurality of windows are modular and inter-changeably mounted high efficiency spectrally transmissive windows associated with the external shroud of the pod housing to permit a mission specific and quick turnaround changeover of a sensor configuration and associated window assemblies.

16. A system as defined in claim 1, wherein the steerable gimbal is mounted to a gyrostabilized platform to reduce motions induced by turbulence and jitter and vibration resulting from movement of a vehicle to which it is mounted.

17. A system as defined in claim 1, wherein the vehicle includes at least one of the following: a fixed wing aircraft, a rotary wing aircraft, an unmanned aerial vehicle, an unmanned ground vehicles, an underwater and surface water remotely operated vehicles, a balloon, an airship platform, a conventional surface mobile vehicle, and a spacecraft.

18. A system as defined in claim 1, further comprising robotic controlling means connected to the steerable gimbal for controlling the seeking and tracking of targets in real-time without the need to process data from the sensor to identify the original targets.

19. A system as defined in claim 1, wherein the pod housing includes at least two windows, and wherein a video camera is co-boresighted with the pod housing to maintain real-time littoral and human intuitive perspective of the spectral data as it is being collected in familiar and unfamiliar operational environments.

20. A system as defined in claim 1, further comprising processing means responsive to said spectral sensor for processing global positioning system and differential global positioning system data to compute spectral sensor location in concert with onboard spectral gimbal geometry for determining and accomplishing automatic tracking against ground targets or via programmed inputs so that the spectral pod steers itself.

21. A system as defined in claim 20, wherein said processing means includes means for using a multi-dimensional moving map display of a physical area to graphically display the location of the spectral sensor pod, orientation of the sensor array and relative target location by tying in known position inputs, to display a multi-dimensional target model of past, ongoing and future instrument mission operations highlighting display overlay of the collected an exploited spectral data over the simulated terrain, thereby providing a more intuitive and littoral interpretation of the context of the spectral data.

22. A system as defined in claim 21, wherein said processing means comprises a computer having a display connected thereto, and said processing means further includes compute graphic user interface display windows associated with said computer and said display to simultaneously display and control multiple spectral sensor data sets as the sets are acquired from various spectral band regions of interest to thereby include GUI display of the live or recorded video camera images.

23. A system as defined in claim 20, wherein said processing means includes imbedding global positioning system data information within an imaging data stream as the data stream originates and travels from the spectral sensor so that each spectral scene captured by the instrument contains global positioning system data augmenting spectral data.

24. A system as defined in claim 1, wherein the steerable gimbal includes means for Controlling point line scanner, whiskbroom and pushbroom type spectral sensors for off-nadir fixed wide area survey and imaging type missions.

25. A system as defined in claim 1, wherein the at least one window is high efficiency spectral frequency matched with the sensor port to permit optimal passage of frequency selected electromagnetic radiation to a detector of the selected spectral sensor within a pod bay of the housing.

26. A system as defined in claim 1, wherein the system defines a consolidated portable mobile spectral processing station which contains all necessary sensor control elements, mobile computing elements, spectral data inputs, calibration inputs, spectral processing software, data recording and storage of collected spectral field information acquired by the spectral sensor in air and ground environments for real-time or near-real time output of processed data to other users, platforms, systems and locations.

27. A method of sensing imaging data, the method including the steps of:
   detecting imaging data via use of a spectral sensor mounted to a steerable gimbal to conduct wide area spatial and spectral searches; and
   using the resulting feedback information to dynamically tune down to ever more increasing levels of spectral and spatial detail to locate and analyze objects of interest.

28. A method for sensing imaging data as defined in claim 27, wherein the method is used to detect or discriminate at least one of the following:
   buried land mines, surface land mines, or waterborne mines;
   genetic crop verification;
   weapons of mass destruction facilities;
   terrorist planning activities, support infrastructure, or storage staging sites;
   terrorist post event release of gases, aerosols, or vapors;
   fugitive gas leaks from damaged structures;
   agricultural and vegetative health assessment;
   tactical activities or detecting camouflage covered items;
   fugitive gases, effluents, or hazardous materials;
   surface or sub-surface leakage of buried materials relating to industrial, chemical, biological or nuclear materials;
   minerals or soils; and
   ground maritime and air environmental conditions.

29. A method of increasing available flight time per ay for aerial imaging of data, the method including the steps of:
   using off-nadir spectral imaging by undertaking flight operations y steering new slant look angles which enable maximum pointing of a spectral sensor away from the sun to effectively acquire a steady and consistently illuminated spectral scene to thereby enabling earlier missions and later missions.

30. A method of sensing imaging data, the method comprising the steps of:

using ground self illuminating objects to serve as terrestrial and solar spectrum reference points for calibrating spectral data for a spectral sensor.

31. A method of sensing imaging data, the method comprising the steps of:

using neural net, heuristic processing, or artificial intelligence techniques to analyze large scale data trends;

and extracting information from a gimbal mounted spectral sensor across the resulting broadband spectral range available from the extended combination of spectral data acquired by the spectral sensor.

32. A method of sensing imaging data, the method comprising the steps of:

auto-tracking plurality of spectral sensors through use of video or thermal-object-based shape algorithms to lock on higher contrast targets to thereby enable the spectral sensors to piggyback from the tracking advantage of the locked sensors to maintain higher spectral dwell time via a parallel co-boresight arrangement and thereby increase sampling capability, reducing errors, and permitting more efficient tracking.

33. A method of sensing data, the method comprising the steps of;

installing a spectral sensor within a conventional television or thermal style pod housing for purposes of concealing the true mission capabilities and nature of the instrument as a spectral collection mechanism.

34. A method of sensing imaging data, the method comprising the steps of:

digitally transmitting raw and processed spectral data as acquired by a spectral sensor mounted to a steerable gimbal while at the target or forward operating site; and processing the data at the site or on a post mission basis for output back to an aircraft, satellite, ground vehicle, maritime vehicle or ground station for additional analysis, processing review, or action based upon information contained within the spectral data stream.

* * * * *